US012687530B2

(12) United States Patent
Broussard et al.

(10) Patent No.: US 12,687,530 B2
(45) Date of Patent: Jul. 21, 2026

(54) METHOD FOR DETERMINING THE ACIDITY OF AN ACIDIC AQUEOUS SOLUTION

(71) Applicants: COMMISSARIAT À L'ENERGIE ATOMIQUE ET AUX ÉNERGIES ALTERNATIVES, Paris (FR); ORANO RECYCLAGE, Chatillon (FR)

(72) Inventors: Sylvain Broussard, Laudun (FR); Sylvain Costenoble, Bagnols sur Ceze (FR); Fabien Lengrand, Bagnols sur Ceze (FR); Johann Sinot, Connaux (FR)

(73) Assignees: COMMISSARIAT À L'ENERGIE ATOMIQUE ET AUX ÉNERGIES ALTERNATIVES, Paris (FR); ORANO RECYCLAGE, Chatillon (FR)

( * ) Notice: Subject to any disclaimer, the term of this patent is extended or adjusted under 35 U.S.C. 154(b) by 826 days.

(21) Appl. No.: 17/757,758

(22) PCT Filed: Dec. 14, 2020

(86) PCT No.: PCT/FR2020/052406
§ 371 (c)(1),
(2) Date: Jun. 20, 2022

(87) PCT Pub. No.: WO2021/130423
PCT Pub. Date: Jul. 1, 2021

(65) Prior Publication Data

US 2023/0341363 A1 Oct. 26, 2023

(30) Foreign Application Priority Data

Dec. 23, 2019 (FR) ....................................... 1915425

(51) Int. Cl.
*G01N 31/22* (2006.01)
*G01N 21/33* (2006.01)

(52) U.S. Cl.
CPC ........... *G01N 31/221* (2013.01); *G01N 21/33* (2013.01)

(58) Field of Classification Search
None
See application file for complete search history.

(56) References Cited

U.S. PATENT DOCUMENTS

2011/0217213 A1* 9/2011 Chen .................... G01N 21/274
422/400

FOREIGN PATENT DOCUMENTS

JP 2005195556 A 7/2005
WO 2008137260 A1 11/2008

OTHER PUBLICATIONS

Bhargava et al., Rapid spectrophotometric method for free acid determination in uranyl nitrate and chloride solutions, 1971, Analytica Chimica Acta, pp. 210 (Year: 1971).*

(Continued)

*Primary Examiner* — Maris R Kessel
*Assistant Examiner* — Mickey Huang
(74) *Attorney, Agent, or Firm* — Chrisman Gallo Tochtrop LLC

(57) ABSTRACT

Methods for determining the acidity of an acidic aqueous solution. These methods make it possible to measure the total acidity of an aqueous solution comprising a strong acid or a mixture of strong acids and, if this solution contains one or more hydrolysable cations, to also measure its free acidity.

14 Claims, 3 Drawing Sheets

(56) References Cited

OTHER PUBLICATIONS

Thakur, Raghbendra, Tarafder, Pranab K. and Jha, Raj Ranjan. “A novel method for the determination of uranium and free acidity in nuclear fuel process samples by extraction spectrophotometry” Radiochimica Acta, vol. 107, No. 4, 2019, pp. 327-337. https://doi.org/10.1515/ract-2018-2965 (Year: 2018).*

Sundar et al., Rapid titrimetric determination of free acidity in process samples of uranyl nitrate, 1998, The Analyst, 123, 1875-1777 (Year: 1998).*

Universite D’iena. “9 Forsterzyklus—UV/Vis-Absorptionsspektroskopie” 1-20 Versuchsanleitungen, Teil 1: Chemische Thermodynamik, Jena, Dec. 1, 2019 (Dec. 1, 2019), pp. 71-77, Retrieved from the Internet: https://www.ipc.uni-jena.de/lehre/bc/prak+i [retrieved on Sep. 9, 2020].

Neri-Quiroz Jose et al. “Miniaturizing and automation of free acidity measurements 1-20 for uranium (VI)-HN03 solutions: Development of a new sequential injection analysis for a sustainable radio-analytical chemistry” Talanta, Elsevier, Jun. 21, 2016, vol. 159, pp. 330-335.

Srinivasan T.G. et al. “Free acidity measurement—A review”, Talanta, Elsevier, 2014, vol. 118, pp. 162-171.

Search Report for French application No. 1915425 dated Sep. 11, 2020.

International Search Report for PCT/FR2020/052406 dated Apr. 21, 2021 and translation thereof.

Written Opinion for PCT/FR2020/052406 dated Apr. 21, 2021.

* cited by examiner

METHOD FOR DETERMINING THE ACIDITY OF AN ACIDIC AQUEOUS SOLUTION

CROSS-REFERENCE TO RELATED APPLICATIONS

This is a National Stage application of PCT international application PCT/FR2020/052406, filed on Dec. 14, 2020, which claims the priority of French Patent Application No. 1915425 filed Dec. 23, 2019, both of which are incorporated herein by reference in their entirety.

TECHNICAL FIELD

The invention relates to the field of analytical chemistry.

More specifically, it relates to methods for determining the acidity of an acidic aqueous solution.

These methods make it possible to measure the total acidity of an aqueous solution comprising a strong acid or a mixture of strong acids and, if this solution comprises one or more hydrolysable cations, i.e. one or more cations which are capable of reacting with water by dissociating into $OH^-$ hydroxide ions and $H^+$ protons, to also measure the free acidity.

The invention can be used in all industrial and scientific research fields where it may be desirable to measure the total acidity or the free acidity of aqueous solutions of strong acids.

However, it is of particular interest:

- on the one hand, for determining the total acidity of aqueous solutions comprising a strong acid or a mixture of strong acids in such a high concentration that it makes the use of methods conventionally used for measuring total acidity, such as pH-metry, unsuitable, and
- on the other hand, for monitoring, either in a laboratory or on an industrial line, the free acidity of aqueous solutions of strong acids which comprise one or more hydrolysable cations and which are used in industrial processes where this free acidity represents a key parameter.

Examples of such methods include hydro-metallurgical methods for the treatment or extraction of metallic elements of interest, in particular from ores, and methods for the treatment of metallic surfaces by acidic chemical pickling.

PRIOR ART

According to the Brønsted-Lowry theory, an acid is a chemical species (ion or molecule) capable of giving up one or more $H^+$ protons according to the equation:

| HA | <=> | $A^-$ | + | $H^+$ |
|---|---|---|---|---|
| acid | | base | | proton |

The acidity of an aqueous solution is therefore characterised by the quantity of $H^+$ protons present in this solution.

When an aqueous solution comprises, in addition to an acid, hydrolysable cations which by reaction with water will also give up $H^+$ protons, it is then possible to make a distinction between the total acidity and the free acidity of this solution.

Thus, the total acidity is given by the total quantity of $H^+$ protons present in the aqueous solution while the free acidity is given by the quantity of $H^+$ protons provided only by the acid present in this solution. In other words, the free acidity does not take into account the $H^+$ protons provided by the hydrolysable cations.

The free acidity is a key parameter for numerous industrial methods involving acidic aqueous solutions that are charged or likely to be charged with hydrolysable cations.

Many methods that make it possible to measure the free acidity of acidic aqueous solutions which contain hydrolysable cations have been described in the literature. These methods have in common that they firstly annihilate the hydrolysis reaction of the hydrolysable cations, for example by precipitation, complexation or fixation on a solid resin-like support, and then determine the free acidity. A prior art document relating to these methods was recently published by T. G. Srinivasan and P. R. Rao in *Talanta* 2014, 118, 162-171, in the following referenced as [1].

Recently, a method for measuring the free acidity of aqueous solutions of nitric acid by sequential injection analysis (SIA) was proposed by J. Néri-Quiroz et al. (*Talanta* 2016, 159, 330-335, in the following referenced as [2]).

This method, which makes it possible to perform free acidity measurements in line on 10 μL samples and generates effluents of only 1.5 mL per sample analysed, is based on a complexation of hydrolysable cations by potassium oxalate followed by a titration by NaOH, the titration being followed by colorimetry, in this case using congo red.

As part of their work, the inventors succeeded in developing methods which make it possible to determine with high precision the total acidity and the free acidity of an acidic aqueous solution according to the type of acidity to be determined.

For the measurement of free acidity, the invention not only has the same advantages as the method of reference [2] (reduction of the volume of samples analysed, reduction of the volume of effluents generated, possibility of automation), but also it is even simpler to implement and more economical in terms of reagents because it does not require an acid-base titration reaction and therefore does not use an alkaline titrant such as NaOH.

DISCLOSURE OF THE INVENTION

The subject-matter of the invention is therefore a first method which has the purpose of determining the total acidity of an aqueous solution A1 comprising a strong acid or a mixture of strong acids (with or without hydrolysable cations) and which comprises at least the following steps:

a) providing an aqueous solution A5 by mixing:
   - a volume V1 of the solution A1,
   - a volume V2 of an aqueous solution A2 of pH denoted pHA2, comprising a compound selected from a weak acid, a weak base, a salt of a weak acid or a salt of a weak base, and
   - a volume V4 of a solution A4 comprising a pH-sensitive dye having an acid form and a base form, and a transition range between a first pH and a second pH, the second pH being higher than the first pH but lower than pHA2;

b) determining the UV-visible absorbance spectrum of the dye present in the solution A5 by using the solution A2 as a measuring blank;

c) determining the concentration of at least one of the acid and base forms of the dye in the solution A5 from the absorbance spectrum obtained in step b);

d) determining the pH, denoted pHA5, of the solution A5 from the concentration determined in step c); then e) determining the total acidity of the solution A1 from the pHA5 determined in step d);

and wherein pHA2 is such that a mixture of the volumes V1 and V2 has a pH which is within the transition range of the dye.

Thus, this first method is based on using the transition range of a pH-sensitive dye, also referred to as a pH colour indicator or acid-base indicator.

However, this use is different from that found in the prior art since, according to the invention, the transition range of the pH-sensitive dye is used neither to determine the range of values in which the pH of an acidic aqueous solution lies nor to locate the chemical equivalence of an acid-base titration, but it is used to determine the concentration of $H^+$ protons of an acidic aqueous solution from the absorption of light by the pH-sensitive dye.

In the above and in the following the terms "strong" and "weak", applied to an acid or a base, have the meaning given to them by Brønsted-Lowry, namely that an acid or base which dissociates completely in water is considered to be strong, while an acid or base which does not dissociate completely in water is considered to be weak.

According to the invention, the selection of the compound present in the solution A2 (weak acid, weak base, salt of a weak acid or salt of a weak base) as well as the selection of the dye are not especially limited.

Thus, the compound present in the solution A2 can be selected from numerous compounds known to be weak acids (carboxylic acids and polycarboxylic acids in particular) or weak bases (ammoniac, amines and polyamines in particular) as well as from the salts thereof.

In a similar manner, the dye can be selected from numerous compounds conventionally used as pH colour indicators such as bromocresol green, congo red, bromophenol blue, methyl yellow, methyl red, etc.

However, as mentioned above, pHA2, which corresponds to the pH of the solution A2, has to be such that the pH of a mixture of volumes V1 and V2 is located in the transition range of the dye, which could easily be verified in advance by preparing this mixture and by determining its pH with a pH paper, pH strip, a pH probe or even by calculation if the order of magnitude of the total acidity of the solution A1 is known.

The compound present in the solution A2, its concentration in this solution and the dye are therefore selected accordingly, it being understood that, if necessary, pHA2 can be adjusted by adding to the solution A2 a strong acid or a strong base, or one and/or the other of the volumes V1 and V2 can be modified in such a way that the pH of their mixture falls within the transition range of the dye.

According to the invention, the determination of the UV-visible absorbance spectrum of the dye present in the solution A5—or step b)—preferably comprises:

acquiring the light intensity spectrum of the solution A2 in the UV-visible range;

acquiring the light intensity spectrum of the solution A5 in the UV-visible range; and calculating the decimal logarithm of the ratio between the light intensity values of the acquired spectrum for the solution A5 and the light intensity values of the acquired spectrum for the solution A2;

the light intensity spectra of the solutions A2 and A5 being advantageously acquired by means of a charge transfer camera, better known as a CCD camera (Charge-Coupled Device).

The absorbance spectrum obtained in this way shows two absorbance peaks (or maxima) which are located at two different wavelengths, one of which is characteristic of the acid form of the dye whereas the other is characteristic of its base form, and which vary on either side of an isobestic point as a function of the pH of the solution A5, pHA5.

In step c), the concentration of at least one of the acid and base forms of the dye in the solution A5 is advantageously determined by applying the Beer-Lambert law, according to which the absorbance measured for a solute in solution at a given wavelength is proportional to the concentration of this solute in the solution, i.e. in practice, by comparing the maximum absorbance shown for this form by the absorbance spectrum obtained in step b) with the absorbance values of standard curves previously established from aqueous solutions comprising the dye at variable concentrations and variable pHs.

In step d), pHA5 can be determined for example by means of the following equation (1):

$$10^{-pHA5} = \frac{K_{HC} \times [HC]}{[C^-]} \quad (1)$$

wherein:

$K_{HC}$ is the dissociation constant of the acid form of the dye in the solution A5;

[HC] is the concentration of the acid form of the dye in the solution A5 in mol/L; and $[C^-]$ is the concentration of the base form of the dye in the solution A5 in mol/L.

In one variant, pHA5 can also be determined by means of the following equation (2):

$$pHA5 = -\log\left(K_{HC}\left(\frac{1}{R} - 1\right)\right) \quad (2)$$

wherein:

$K_{HC}$ is as previously defined; and

R is the ratio between the concentration of the base form of the dye in the solution A5 and the concentration of the dye (acid form+base form) in this solution.

In step e), the total acidity of the solution A1, expressed as the molar concentration of $H^+$ protons, denoted $[H^+]$, can for example be determined by means of the following equation (3):

$$[H^+] = \frac{10^{-pHA5} \times (V1 + V2) - 10^{-pHA2} \times V2 + Y}{V1} \quad (3)$$

wherein:

V1 and V2, pHA2 and pHA5 are as previously defined, V1 and V2 being expressed in L; and Y is determined by means of the following equation (4):

$$Y = \frac{10^{-pHA5} \times [A^-] \times V2 - K_{HA} \times [HA] \times V2}{K_{HA} + 10^{-pHA5}} \quad (4)$$

wherein:

$K_{HA}$ is the acidic dissociation constant of the weak acid in the solution A5 (if the solution A2 comprises a weak acid or a salt of a weak acid) or of the conjugate acid of the weak base in the solution A5 (if solution A2 comprises a weak base or a salt of a weak base);

$[A^-]$ is the concentration of the conjugate base of the weak acid in the solution A2 or of the weak base in the solution A5 in mol/L;

[HA] is the concentration of the weak acid in the solution A2 or of the conjugate acid of the weak base in the solution A5 in mol/L; and V2 and pHA5 are as defined above, V2 being expressed in L.

It should be noted that the acidic dissociation constant $K_{HA}$ of the weak acid or of the conjugate acid of the weak base in the solution A5 can be previously determined either from the literature data or preferably by experiment.

In this latter case, a volume V1 of an aqueous solution of a strong acid with a known concentration C1, such as a commercially available standard solution, is added to the volume V2 of the solution A2, then the pH of the resulting mixture M is measured by means of a pH probe and $K_{HA}$ is determined by means of the following equation (5):

$$K_{HA} = \frac{[C2 \times V2 - (C1 \times V1 + n - 10^{-pH} \times (V1 + V2))] \times 10^{-pH}}{C1 \times V1 + n - 10^{-pH} \times (V1 + V2)} \quad (5)$$

wherein:

pH corresponds to the pH of the mixture M;

C1 and C2 are as defined above and are expressed in mol/L;

V1 and V2 are as defined above and are expressed in L; and n is the number of moles of acid or base that were used, where applicable, to adjust the pH of the solution A2.

The dissociation constant $K_{HC}$ of the acid form of the dye in the solution A5 can also be determined either from the literature data or preferably by experiment.

In this latter case, the UV-visible absorbance spectrum of the previously defined mixture M is determined by using the solution A2 as a measuring blank, then the absorbance spectrum of a mixture M' resulting from the addition to the mixture M of the volume V4 of the solution A4 is determined by using the mixture M as a measuring blank.

With reference to previously established calibration curves, it is then possible to determine, from the peaks of the acid and base forms of the dye visible on the absorbance spectrum obtained for the mixture M', the concentration of at least one of the acid and base forms of the dye in the mixture M' and to determine the dissociation constant $K_{HC}$ by means of the following equation (6):

$$K_{HC} = \frac{10^{-pH}}{\frac{1}{R} - 1} \quad (6)$$

wherein:

pH is the pH of the mixture M; and

R is the ratio between the concentration of the base form of the dye in the mixture M' and the concentration of the dye (acid form+base form) in this mixture.

The subject-matter of the invention is also a second method which has the aim of determining the free acidity of an aqueous solution A1 comprising a strong acid or a mixture of strong acids and one or more hydrolysable cations and which comprises at least the following steps:

a) providing an aqueous solution A3 by mixing a volume V1 of the solution A1 and a volume V2 of an aqueous solution A2 of pH denoted pHA2, comprising a compound selected from a weak acid, a weak base, a salt of a weak acid or a salt of a weak base, and an agent complexing the hydrolysable cation(s) in a concentration C2;

b) determining the UV-visible absorbance spectrum of the hydrolysable cation(s) present in the solution A3 by using the solution A2 as a measuring blank;

c) determining the concentration C3 of the hydrolysable cation(s) in the solution A3 from the absorbance spectrum obtained in step b);

d) providing an aqueous solution A5 by mixing the solution A3 and a volume V4 of a solution A4 comprising a pH-sensitive dye, having an acid form and a base form, and a transition range between a first pH and a second pH, the second pH being higher than the first pH but lower than pHA2;

e) determining the UV-visible absorbance spectrum of the dye present in the solution A5 by using the solution A2 or the solution A3 as a measuring blank;

f) determining the concentration of at least one of the acid and base forms of the dye in the solution A5 from the absorbance spectrum obtained in step e);

g) determining the pH, denoted pHA5, of the solution A5 from the concentration determined in step f); then h) determining the free acidity of the solution A1 from the concentration C3 determined in step c) and from pHA5 determined in step e);

and wherein:

pHA2 and the volumes V1 and V2 are such that the solution A3 has a pH denoted pHA3, which is within the transition range of the dye;

the concentration C2 and the volumes V1 and V2 are such that the complexing agent is in excess with respect to the hydrolysable cation(s) in the solution A3.

This second method is based on the same principle as the first method but differs from the latter in that, on the one hand, the solution A2 comprises an agent complexing the hydrolysable cation(s) present in the solution A1 whose free acidity is to be determined, and on the other hand it comprises determining by spectrometry the concentration of the hydrolysable cation(s), this concentration being taken into account to determine the concentration of $H^+$ protons only supplied by the acid in the solution A1.

According to the invention, the choice of the complexing agent is not especially limited as long as this complexing agent makes it possible to form stable and water-soluble complexes with the hydrolysable cation(s) known to be present or presumed to be present in the solution A1.

Thus, the complexing agent can be in particular glycine, a polycarboxylic acid of the citric acid, tartaric acid, oxalic acid or succinic acid type, a hydroxycarboxylic acid of the gluconic acid, idonic acid or galactonic acid type, a hydroxydicarboxylic acid of the glucaric acid, mucic acid or mannaric acid type, an aminopolycarboxylic acid of the iminodiacetic acid (IDA), nitrilotriacetic acid (NTA), ethylenediaminetetraacetic acid (EDTA), diethylenetriaminepentaacetic acid (DTPA), 1,4,7,10-tetraazacyclododecane-1,4,7,10-tetraacetic acid (DOTA) type, or a salt thereof, for example a salt of an alkali metal such as sodium or potassium, a salt of an alkaline earth metal such as calcium or magnesium, or even a salt of a transition metal.

Preferably, the compound present in the solution A2 is also used as a complexing agent, which is possible in particular if the compound present in the solution A2 is selected from the aforementioned complexing acids and the salts thereof and, in particular, if solution A2 is an oxalic acid solution or a salt thereof.

According to the invention, step b) preferably comprises:

acquiring the light intensity spectrum of the solution A2 in the UV-visible range;

acquiring the light intensity spectrum of the solution A3 in the UV-visible range; and calculating the decimal logarithm of the ratio between the light intensity values of the acquired spectrum for the solution A3 and the light intensity values of the acquired spectrum for the solution A2;

the light intensity spectra of the solutions A2 and A3 being advantageously acquired by means of a CCD camera.

The absorbance spectrum obtained in this way is characteristic of the hydrolysable cation(s) present in the solution A3 and therefore in the solution A1.

In step d), the concentration C3 of the hydrolysable cation(s) in the solution A3 is advantageously determined from the absorbance peak(s) visible on the absorbance spectrum obtained in step c) for the solution A3, also by applying the Beer-Lambert law, i.e. in practice by comparing the maximum absorbance shown by the absorbance spectrum obtained in step c) to absorbance values of standard curves previously established from aqueous solutions comprising the hydrolysable cation(s) known to be present or presumed to be present in the solution A1 in variable concentrations.

According to the invention, step e) comprises preferably:

acquiring the light intensity spectrum of the solution A5 in the UV-visible range; and calculating the decimal logarithm of the ratio between the light intensity values of the acquired spectrum for the solution A5 and the light intensity values of the acquired spectrum for the solution A3;

the light intensity spectrum of the solution A5 being, there also, advantageously acquired by means of a CCD camera.

Step f), which is for determining the concentration of at least one of the acid and base forms of the dye in the solution A5 from the absorbance spectrum obtained in step e), is advantageously carried out in the same way as step c) of the first method.

In a similar manner, in step g), pHA5 is advantageously determined by means of one of equations (1) and (2) defined above for step d) of the first method.

In step h), the free acidity of the solution A1, expressed as the molar concentration of $H^+$ protons, denoted $[H^+]$, is determined taking into account the concentration C3 determined in step c), for example by means of the equation (3) defined above for step e) of the first method but wherein Y is determined by applying the following equation (7):

$$Y = \frac{10^{-pHA5} \times \left([A^-] \times V2 - \frac{n}{m} C3 \times V1\right) - K_{HA} \times [HA] \times V_1}{K_{HA} + 10^{-pHA5}} \quad (7)$$

wherein:

m is the stoichiometric coefficient of the hydrolysable cation(s) in the complexing reaction of the cation(s) by the complexing agent;

n is the stoichiometric coefficient of the complexing agent in the complexing reaction of the hydrolysable cation (s) by this agent; and V1, V2, $K_{HA}$, $[A^-]$, [HA] and C3 are as defined above, V1 and V2 being expressed in L and $[A^-]$, [HA] and C3 being expressed in mol/L.

In either the first method or the second method, the solution A2 preferably comprises a weak acid or a salt of a weak acid.

Preferably, the solution A2 comprises oxalic acid or a salt thereof, preferably sodium oxalate.

Furthermore, the dye is preferably bromocresol green, the transition range of which is between pH 3.8 and pH 5.4.

In which case, it is particularly preferred that the solution A2 is a solution comprising 0.27 mol/L of sodium oxalate and the pH of which, initially 8, is adjusted by addition of a strong acid, for example sulfuric acid, so as to be higher than 5.4 while being less than 8, for example between 5.5 and 6.

As for the solution A1, it is preferably an aqueous solution of nitric acid comprising or not comprising hydrolysable cations.

However, the solution A1 can also be an aqueous solution other than nitric acid such as an aqueous solution comprising hydrochloric acid, sulfuric acid, hydrofluoric acid, etc., or a mixture thereof, with or without hydrolysable cations.

Other features and advantages of the invention are apparent from the following further description which relates to tests which validate the invention and is given with reference to the accompanying figures.

It goes without saying however that this further description is given only as an illustration of the invention and should not be interpreted in any way as a limitation of this subject-matter.

DETAILED DISCLOSURE OF PARTICULAR EMBODIMENTS

Figure 1:
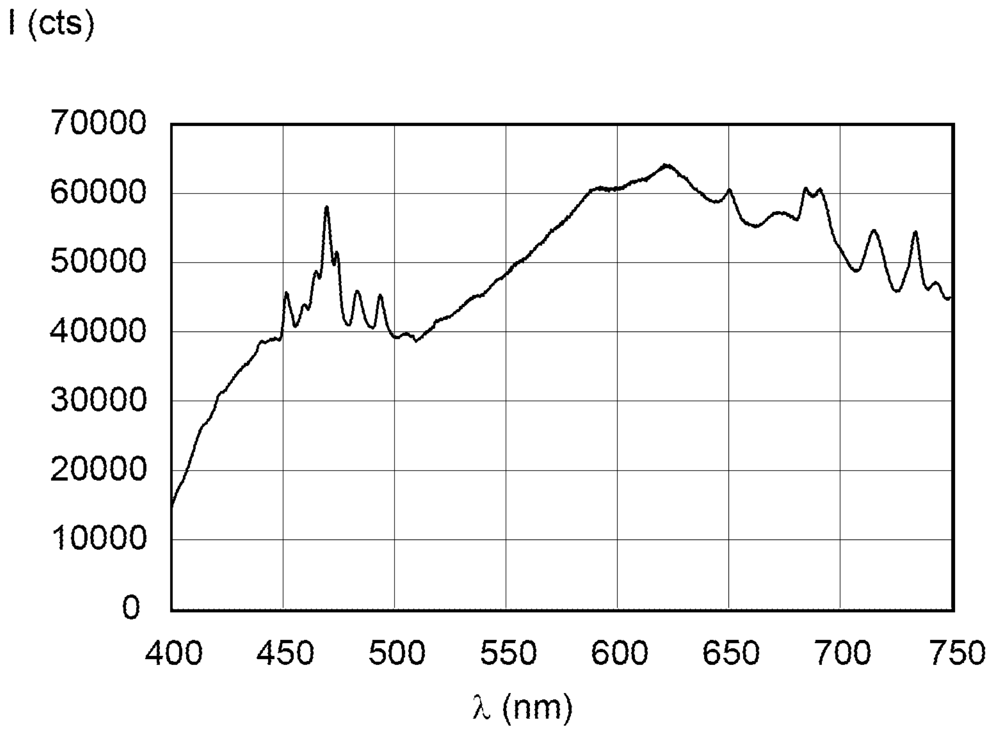
FIG. 1 illustrates, by way of example, the light intensity spectrum (denoted I and expressed in counts) acquired by means of a CCD camera, over the wavelength range between 400 nm and 750 nm, for a solution A2 comprising 0.27 mol/L of sodium oxalate, with a pH of 5.7.
Figure 2:
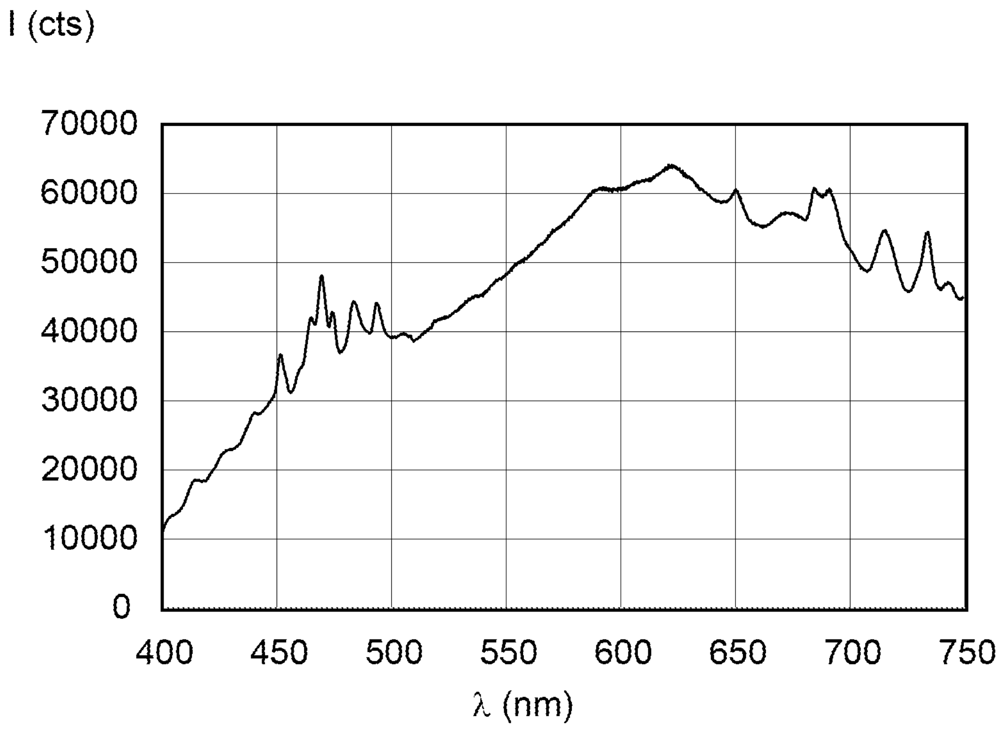
FIG. 2 illustrates, by way of example, the light intensity spectrum (denoted I and expressed in counts) acquired by means of a CCD camera, over the wavelength range between 400 nm and 750 nm, for a solution A3 obtained by mixing 1 000 μL of the solution A2, the spectrum of which is shown in FIG. 1, and a sample of 50 μL of an aqueous solution A1 comprising 2 mol/L of nitric acid and 0.56 mol/L of uranium (VI).
Figure 3:
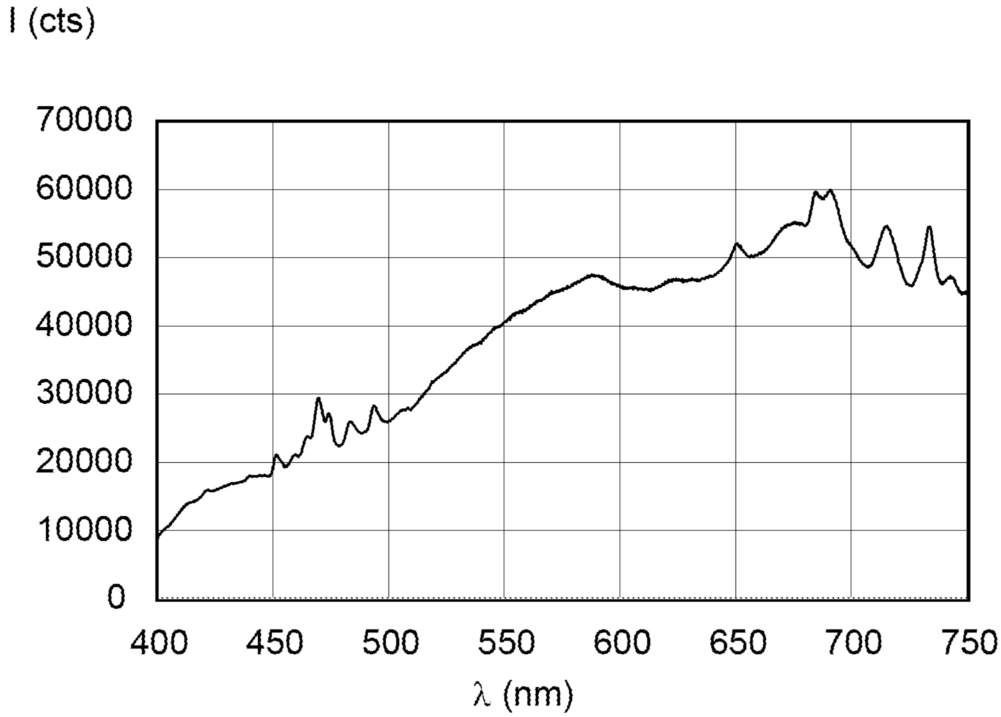
FIG. 3 illustrates, by way of example, the light intensity spectrum (denoted I and expressed in counts) acquired by means of a CCD camera, over the wavelength range between 400 nm and 750 nm, for a solution A5 obtained by mixing the solution A3, the light intensity spectrum of which is shown in FIG. 2, and 150 μL of an aqueous solution A4 of bromocresol green at 0.02% by mass.
Figure 4:
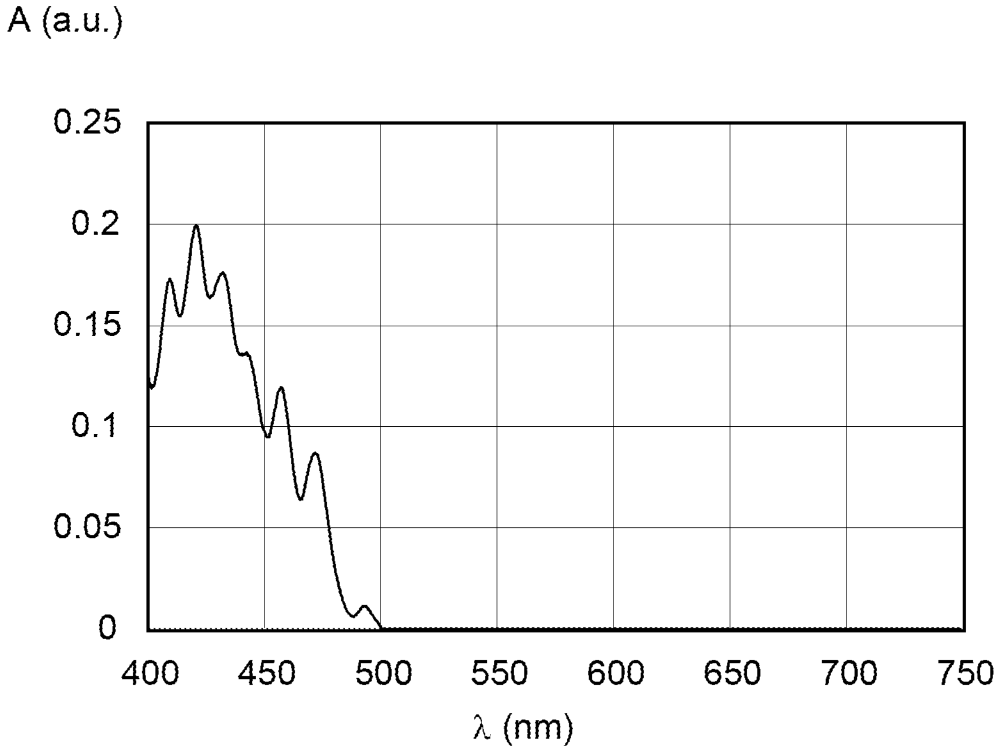
FIG. 4 illustrates, by way of example, the absorbance spectrum (denoted A and expressed in arbitrary units) of the uranyl cations present in the solution A3, this spectrum having been obtained by using the light intensity spectrum shown in FIG. 2 as a measurement and the light intensity spectrum shown in FIG. 1 as a measuring blank.
Figure 5:
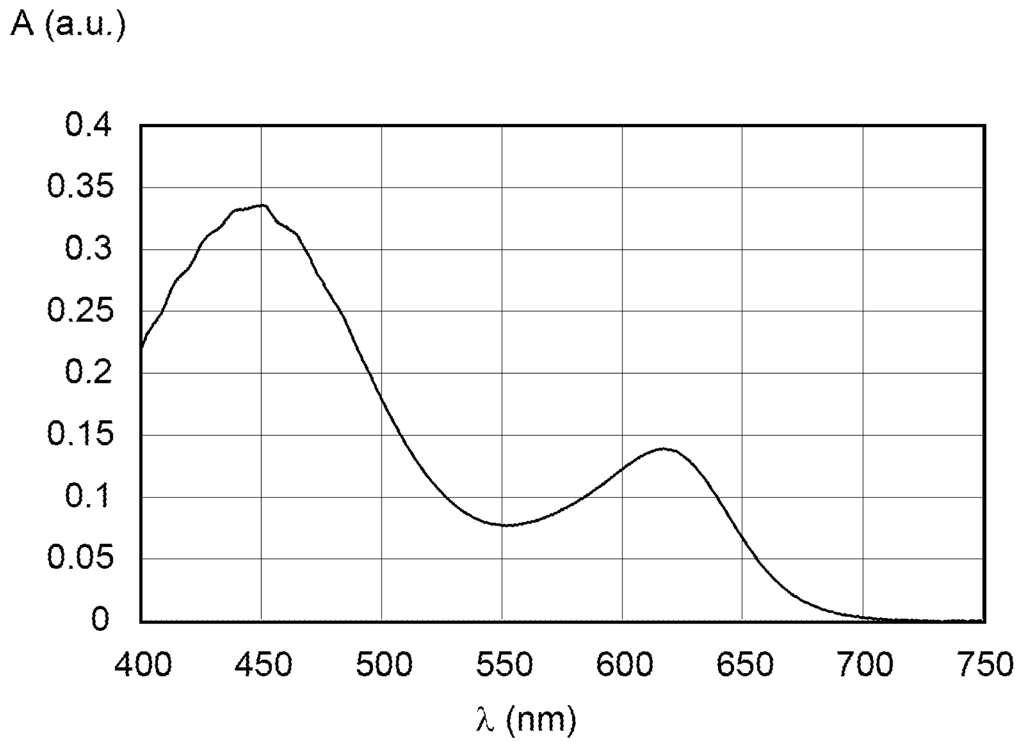
FIG. 5 illustrates, by way of example, the absorbance spectrum (denoted A and expressed in arbitrary units) of the bromocresol green present in the solution A5, this spectrum having been obtained by using the light intensity spectrum shown in FIG. 3 as a measurement and the light intensity spectrum shown in FIG. 2 as a measuring blank.

The method of the invention has been validated by tests aimed at verifying whether this method makes it possible to find with an acceptable bias (ideally less than 5%) the free acidity, i.e. the acidity linked to the sole presence of nitric acid, of aqueous solutions comprising, in addition to nitric acid in a known concentration, uranium(VI) and/or plutonium(IV), also in a known concentration.

These tests were performed manually on the one hand and by automation on the other hand.

Example I—Manual Tests

Manual tests were carried out at ambient temperature (20-25° C.) in nuclear glove boxes using:

as solution A2: an aqueous solution saturated with sodium oxalate, comprising 0.27 mol/L of $Na_2C_2O_4$ where the pH has been adjusted to 5.7 by the addition of sulfuric acid;

as A1 solutions to be analysed: a series of aqueous solutions comprising:

nitric acid in a concentration ranging from 1.0 mol/L to 4.99 mol/L, and either uranium(VI) in a concentration of 33 g/L, 66 g/L or 133 g/L, or plutonium(IV) in a concentration of 20 g/L;

as solution A4: an aqueous solution of bromocresol green at 0.02%; and as spectrophotometer: a SpectraPro SP500i UV-visible spectrophotometer (Roper Scientific) equipped with a cell with an optical path equal to 10 mm.

Each test was performed by using a 1 000 μL volume of solution A2, a 50 μL volume of solution A1 and a 150 μL volume of solution A4.

The acid dissociation constant $K_{HA}$ of oxalic acid and the dissociation constant $K_{HC}$ of the acid form of bromocresol green in test conditions were determined previously by experiment.

In test conditions, $K_{HA}$ is equal to 3.8 whereas $K_{HC}$ is equal to 4.55.

The tests were carried out according to the following operating protocol:

1. introducing the volume of solution A2 in the spectrophotometry cell and acquisition of the light intensity spectrum in the UV-visible range (here 400 nm-750 nm);
2. adding into the spectrophotometry cell the volume of solution A1, mixing of this volume with solution A2 already present in this cell and acquisition of the light intensity spectrum on the same wavelengths as previously mentioned;
3. adding into the spectrophotometry cell the volume of solution A4 and mixture of this volume with the mixture solution A2/solution A1 already present in this cell and acquisition of the light intensity spectrum on the same wavelengths as previously mentioned;
4. determining the absorbance spectrum of the hydrolysable cation, namely $UO_2^{2+}$ in the case of uranium(VI) and $Pu^{4+}$ in the case of plutonium(IV), at the same wavelengths as above by calculating the decimal logarithm of the ratio between the light intensity values of the acquired spectrum in point 2 above and the light intensity values of the acquired spectrum in point 1 above;
5. determining the absorbance spectrum of the dye on the same wavelengths as above by calculating the decimal logarithm of the ratio between the light intensity values of the acquired spectrum in point 3 above and the light intensity values of the acquired spectrum in point 2 above;
6. determining, from the maximum absorbance observed for the base form of the dye on the absorbance spectrum obtained in point 5 above and by reference to previously established standard curves, of the ratio R between the concentration of the base form of the dye present in the mixture solution A2/solution A1/solution A4 and the total concentration of the dye in this mixture;
7. determining the pH of the mixture solution A2/solution A1/solution A4 by means of the equation (2) defined above, which in this case becomes:

$$pHA5 = -\log\left(10^{-4,55}\left(\frac{1}{R} - 1\right)\right);$$

and 8. determining the free acidity of the solution A1, expressed as the molar concentration of $H^+$ protons, denoted $[H^+]$, by means of the equation (3) as defined above, which in the present case becomes:

$$[H^+] = \frac{10^{-pHA5} \times (5.10^{-5} + 10^{-3}) - 10^{-5,7} \times 10^{-3} + Y}{5.10^{-5}}$$

and wherein:

pHA5 is the pH of the mixture solution A2/solution A1/solution A4 as determined in point 7 above, and Y is determined by means of the equation (7) as defined above, which in the present case becomes:

$$Y = \frac{10^{-pHA5} \times \left([A^-] \times 10^{-3} - \frac{n}{m} C3 \times 5.10^{-5}\right) - 10^{-3,8} \times [HA] \times 5.10^{-5}}{10^{-3,8} + 10^{-pHA5}}$$

wherein:

m is equal to 1 and n is equal to 3 as, in strong oxalic excess, the complexing reactions of $UO_2^{2+}$ and $Pu^{4+}$ cations are written as:

$$UO_2^{2+} + 3C_2O_4^{2-} <=> UO_2(C_2O_4)_3^{4-}$$

$$Pu^{4+} + 3C_2O_4^{2-} <=> Pu(C_2O_4)_3^{2-}$$

C3 represents the concentration in mol/L of the $UO_2^{2+}$ or $Pu^{4+}$ cation in the mixture solution A2/solution A1/solution A4.

In the present tests, the concentration C3 was not obtained experimentally but was introduced into the equation (7) by taking the concentration of uranium(VI) or plutonium(IV) in the analysed solution A1.

Table I below specifies for each analysed solution A1:

its concentration, expressed in g/L, of uranium(VI) or plutonium(IV), its concentration, expressed in mol/L, of nitric acid, the pH theoretically presented by the mixture solution A2/solution A1/solution A4 obtained in point 3 above (referred to as "theoretical pH"), the pH of this mixture as determined in point 7 above (referred to as "measured pH" in Table I), the free acidity of solution A1, expressed in mol/L, as determined in point 8 above (referred to as "measured free acidity" in Table I) as well as the relative difference, expressed in %, between the concentration of nitric acid in the solution A1 and the free acidity of this solution.

TABLE I

| Solutions A1 | | | | | Measured free | Relative |
|---|---|---|---|---|---|---|
| [Cation] (g/L) | | $[HNO_3]$ (mol/L) | Theoretical pH | Measured pH | acidity (mol/L) | difference (%) |
| U(VI) | 33 | 1.0 | 4.17 | 4.19 | 0.96 | +4.00 |
| | 66 | | 4.12 | 4.11 | 1.01 | −1.00 |
| | 133 | | 4.00 | 4.00 | 1.00 | 0 |
| U(VI) | 33 | 1.5 | 3.94 | 3.93 | 1.51 | −0.66 |
| | 66 | | 3.88 | 3.88 | 1.50 | 0 |
| | 133 | | 3.74 | 3.72 | 1.54 | −2.66 |
| U(VI) | 33 | 2.0 | 3.75 | 3.72 | 2.08 | −3.8 |
| | 66 | | 3.68 | 3.70 | 1.96 | +2.0 |
| | 133 | | 3.50 | 3.51 | 1.99 | +0.50 |
| Pu(IV) | 20 | 3.02 | 4.10 | 4.11 | 3.04 | −0.66 |
| | | 3.93 | 3.95 | 3.98 | 3.85 | +2.03 |
| | | 4.99 | 3.79 | 3.81 | 5.00 | −0.20 |

This table shows that the method of the invention makes it possible to determine the free acidity of acidic aqueous solutions comprising a hydrolysable cation with a bias with respect to the true value of this acidity of at most 4% and this regardless of the concentrations of acid and hydrolysable cations of these solutions.

Example II—Automated Tests

The automated tests were performed at ambient temperature (20-25° C.) by using a device comprising:

- the same spectrophotometer as the one used in the manual tests described in example I above;
- a device making it possible to distribute into the cell of the spectrophotometer, by means of micropipettes, volumes of solutions A2, A1 and A4 necessary for carrying out the tests; and
- software for controlling the distribution device as well as software for processing and analysing the data provided by the UV-visible spectra acquired by the spectrophotometer.

These tests were also carried out using:

- the same solution A2 and the same solution A4 as those used in the manual tests described in example I above; and
- as solutions A1 for analysis: aqueous solutions, referred to in the following as solutions 1, 2, 3 and 4, comprising:
  - nitric acid in a concentration ranging from 1.08 mol/L to 10.02 mol/L,
  - uranium(VI) in a concentration ranging from 45 g/L to 75 g/L and plutonium(IV) in a concentration ranging from 4 g/L to 7 g/L.

The composition of these solutions is specified in Table II below.

This table also specifies, for each solution A1 to be analysed, the used volume of this solution as well as the used volumes of solution A2 and A4.

TABLE II

| Solutions A1 | [U(VI)] (g/L) | [Pu(IV)] (g/L) | $[HNO_3]$ (mol/L) | Vol. solution A1 (μL) | Vol. solution A2 (μL) | Vol. solution A4 (μL) |
|---|---|---|---|---|---|---|
| 1 | 75 | 4 | 1.08 | 30 | 770 | 100 |
| 2 | 65 | 5 | 3.23 | 20 | 780 | 100 |
| 3 | 55 | 6 | 7.04 | 10 | 790 | 100 |
| 4 | 45 | 7 | 10.02 | 10 | 790 | 100 |

All of the solutions A1 were analysed in duplicate following the same procedure as described in the example I above, except that the concentrations of the uranyl $UO_2^{2+}$ and $Pu^{4+}$ cations in each of the mixtures solution A2/solution A1/solution A4 were determined from the absorbance spectrum obtained in point 4 of this protocol, by reference to previously established standard curves.

As above, the free acidity of solutions A1, expressed as a molar concentration of $H^+$ protons, denoted $[H^+]$, was determined by means of the equation (3) as defined above.

Table III below shows for each solution A1 analysed and each duplicate of this solution:

- the concentration of uranium(VI) and the concentration of plutonium(IV) in the solution A1 as determined from the absorbance spectrum obtained in point 4 of the operating protocol, these concentrations being expressed in g/L,
- the pH theoretically presented by the mixture solution A2/solution A1/solution A4 obtained in point 3 of the operating protocol (referred to as "theoretical pH"),
- the pH of this mixture as determined in point 7 of the operating protocol (referred to as "measured pH" in Table III),
- the free acidity of solution A1, expressed in mol/L, as determined in point 8 of the operating protocol (referred to as "measured free acidity" in Table III), as well as
- the relative difference, expressed in %, existing between the concentration of nitric acid in the solution A1 and the free acidity of this solution.

TABLE III

| Solutions A1 | Measured [U(VI)] (g/L) | Measured [Pu(IV)] (g/L) | Theoretical pH | Measured pH | Measured free acidity (mol/L) | Relative difference (%) |
|---|---|---|---|---|---|---|
| 1 | 81.5 | 5.3 | 4.333 | 4.342 | 1.066 | +1.28 |
| | 82.9 | 5.1 | | 4.344 | 1.063 | +1.54 |
| 2 | 73.6 | 7.2 | 4.015 | 4.023 | 3.193 | +1.14 |
| | 76.3 | 7.0 | | 4.018 | 3.220 | +0.30 |
| 3 | 52.8 | 8.1 | 4.057 | 4.054 | 7.081 | −0.58 |
| | 55.8 | 7.9 | | 4.052 | 7.100 | −0.85 |
| 4 | 44.1 | 9.3 | 3.829 | 3.833 | 9.981 | +0.39 |
| | 40.9 | 9.5 | | 3.839 | 9.889 | +1.31 |

This table shows that the method of the invention, when implemented in an automated manner, makes it possible to determine the free acidity of solutions of aqueous acids comprising hydrolysable cations with a bias with respect to the true value of this acidity of less than 2% and this regardless of the concentrations of acid and hydrolysable cations in these solutions.

REFERENCES CITED

[1] T. G. Srinivasan and P. R. Rao, *Talanta* 2014, 118, 162-171

[2] J. Néri-Quiroz et al., *Talanta* 2016, 159, 330-335

What is claimed is:

1. A method for determining a free acidity of an aqueous solution A1 comprising a strong acid or a mixture of strong acids and one or more hydrolysable cations, wherein the free acidity is determined without neutralization of the strong acid by an acid-base titration, the method comprising at least the following steps:

a) forming an aqueous solution A3 comprising a volume V1 of the solution A1 and a volume V2 of an aqueous solution A2 having pH pHA2, wherein A2 comprises a compound selected from the group consisting of a weak acid, a weak base, a salt of a weak acid and a salt of a weak base, and an agent complexing the hydrolysable cation(s), wherein the agent complexing the hydrolizable cation(s) having a concentration of C2;

b) measuring a UV-visible absorbance spectrum of the hydrolysable cation(s) present in the solution A3 by using the solution A2 as a measuring blank using a spectrophotometer;

c) determining a concentration C3 of the hydrolysable cation(s) in the solution A3 from the absorbance spectrum obtained in step b);

d) forming an aqueous solution A5 by mixing the solution A3 and a volume V4 of a solution A4 wherein A4 comprises a pH-sensitive dye having an acid form and a base form, and a transition range between a first pH and a second pH, the second pH being higher than the first pH but lower than pHA2;

e) measuring a UV-visible absorbance spectrum of the dye present in the solution A5 by using the solution A2 or the solution A3 as a measuring blank using a spectrophotometer;

f) determining a concentration of at least one of the acid form or the base form of the dye in the solution A5 from the absorbance spectrum obtained in step e);

g) determining a pH pHA5 of the solution A5 from the concentration determined in step f); then h) determining the free acidity of the solution A1 from the concentration C3 determined in step c) and from the pHA5 determined in step g), wherein no alkaline titrant is added to solution A1, A3, or A5 to neutralize the strong acid during determination of the free acidity, and wherein pHA2 and the volumes V1 and V2 are such that the solution A3 has a pH, pHA3 which is within the dye transition range; and wherein the concentration C2 and the volumes V1 and V2 are such that the complexing agent is in excess with respect to the hydrolysable cation(s) in the solution A3.

2. The method of claim 1, wherein the compound present in the aqueous solution A2 is the complexing agent.

3. The method of claim 1, wherein step b) comprises:

acquiring a light intensity spectrum of the solution A2 in a UV-visible range, whereby light intensity values are obtained for the solution A2;

acquiring a light intensity spectrum of the solution A3 in the UV-visible range, whereby light intensity values are obtained for the solution A3; and calculating a decimal logarithm of a ratio between the light intensity values obtained for the solution A3 and the light intensity values obtained for the solution A2.

4. The method of claim 3, wherein step c) comprises applying the Beer-Lambert law.

5. The method of claim 3, wherein step e) comprises:

acquiring a light intensity spectrum of the solution A5 in a UV-visible range, whereby light intensity values are obtained for the solution A5; and calculating a decimal logarithm of a ratio between the light intensity values obtained for the solution A5 and the light intensity values obtained for the solution A3.

6. The method of claim 5, wherein step f) comprises applying the Beer-Lambert law.

7. The method of claim 1, wherein step g) comprises applying equation (1):

$$10^{-pHA5} = \frac{K_{HC} \times [HC]}{[C^-]} \quad (1)$$

wherein:

$K_{HC}$ is a dissociation constant of the acid form of the dye in the solution A5;

[HC] is a concentration of the acid form of the dye in the solution A5 in mol/L; and $[C^-]$ is a concentration of the base form of the dye in the solution A5 in mol/L.

8. The method of claim 1, wherein step g) comprises $$pHA5 = -\log\left\{K_{HC}\left(\frac{1}{R} - 1\right)\right\} \quad (2)$$

wherein:

$K_{HC}$ is a dissociation constant of the acid form of the dye in the solution A5; and R is a ratio between a concentration of the base form of the dye in the solution A5 and a concentration of the dye in the solution A5.

9. The method of claim 1, wherein the free acidity of solution A1, expressed in molar concentration of $H^+$ protons, denoted $[H^+]$, is determined by equation (3):

$$[H^+] = \frac{10^{-pHA5} \times (V1 + V2) - 10^{-pHA2} \times V2 + Y}{V1} \quad (3)$$

wherein:

V1 and V2 are expressed in L; and

Y is determined by equation (7):

$$Y = \frac{10^{-pHA5} \times \left([A^-] \times V2 - \frac{n}{m} C3 \times V1\right) - K_{HA} \times [HA]_1 \times V_1}{K_{HA} + 10^{-pHA5}} \quad (7)$$

wherein:

m is a stoichiometric coefficient of the hydrolysable cation(s) in a complexing reaction of the hydrolysable cation(s) by the complexing agent;

n is a stoichiometric coefficient of the complexing agent in the complexing reaction of the hydrolysable cation(s) by the complexing agent;

if the solution A2 comprises a weak acid or a salt of a weak acid, then:

$K_{HA}$ is an acid dissociation constant of the weak acid in the solution A5;

$[A^-]$ is a concentration of a conjugate base of the weak acid in the solution A2 in mol/L;

[HA] is the concentration of the weak acid in the solution A2 in mol/L;

if the solution A2 comprises a weak base or a salt of a weak base, then:

$K_{HA}$ is an acid dissociation constant of a conjugate acid of the weak base in the solution A5;

$[A^-]$ is a concentration of the weak base in the solution A5 in mol/L;

[HA] is a concentration of the conjugate acid of the weak base in the solution A5 in mol/L;

V1 and V2 are expressed in L and C3 is expressed in mol/L.

10. The method of claim 1, wherein the solution A2 comprises oxalic acid or a salt thereof.

11. The method of claim 1, wherein the dye is bromocresol green.

12. The method of claim 1, wherein the solution A1 is an aqueous solution of nitric acid.

13. A method for determining a free acidity of an aqueous solution A1 comprising a strong acid or a mixture of strong acids and one or more hydrolysable cations, the method comprising:

a) forming an aqueous solution A3 comprising a volume V1 of the solution A1 and a volume V2 of an aqueous solution A2 having a pH pH_A2, wherein the solution A2 comprises a compound selected from the group consisting of a weak acid, a weak base, a salt of a weak acid, and a salt of a weak base, and an agent for complexing the hydrolysable cation(s), the complexing agent being present at a concentration C2;

b) measuring a UV-visible absorbance spectrum of the hydrolysable cation(s) present in the solution A3 using a spectrophotometer, after complexation of the hydrolysable cation(s), with the solution A2 used as a measuring blank;

c) determining a concentration C3 of the hydrolysable cation(s) in the solution A3 from the absorbance spectrum measured in step b);

d) forming an aqueous solution A5 by mixing the solution A3 with a volume V4 of a solution A4, wherein the solution A4 comprises a pH-sensitive dye having an acid form and a base form and a transition range between a first pH and a second pH, the second pH being higher than the first pH and lower than pH_A2;

e) measuring a UV-visible absorbance spectrum of the pH-sensitive dye present in the solution A5 using a spectrophotometer, with the solution A2 or the solution A3 used as a measuring blank, wherein the absorbance spectrum reflects relative concentrations of the acid form and the base form of the pH-sensitive dye after complexation of the hydrolysable cation(s);

f) determining a concentration of at least one of the acid form or the base form of the pH-sensitive dye in the solution A5 from the absorbance spectrum measured in step e);

g) determining a pH pH_A5 of the solution A5 from the concentration determined in step f); and h) determining the free acidity of the solution A1 from the concentration C3 determined in step c) and from the pH pH_A5 determined in step g), wherein pH_A2 and the volumes V1 and V2 are selected such that the solution A3 has a pH pH_A3 within the transition range of the pH-sensitive dye; and wherein the concentration C2 and the volumes V1 and V2 are selected such that the complexing agent is present in excess with respect to the hydrolysable cation(s) in the solution A3.

14. A method for determining a free acidity of an aqueous solution A1 comprising a strong acid or a mixture of strong acids and one or more hydrolysable cations, wherein the method is configured to determine the free acidity independently of proton release caused by hydrolysis of the hydrolysable cation(s), the method comprising:

a) forming an aqueous solution A3 comprising a volume V1 of the solution A1 and a volume V2 of an aqueous solution A2 having a pH pH_A2, wherein the solution A2 comprises a compound selected from the group consisting of a weak acid, a weak base, a salt of a weak acid, and a salt of a weak base, and an agent for complexing the hydrolysable cation(s), the complexing agent being present at a concentration C2;

b) measuring a UV-visible absorbance spectrum of the hydrolysable cation(s) present in the solution A3 using a spectrophotometer, after complexation of the hydrolysable cation(s), with the solution A2 used as a measuring blank;

c) determining a concentration C3 of the hydrolysable cation(s) in the solution A3 from the absorbance spectrum measured in step b);

d) forming an aqueous solution A5 by mixing the solution A3 with a volume V4 of a solution A4, wherein the solution A4 comprises a pH-sensitive dye having an acid form and a base form and a transition range between a first pH and a second pH, the second pH being higher than the first pH and lower than pH_A2;

e) measuring a UV-visible absorbance spectrum of the pH-sensitive dye present in the solution A5 using a spectrophotometer, with the solution A2 or the solution A3 used as a measuring blank, wherein the absorbance spectrum reflects relative concentrations of the acid form and the base form of the pH-sensitive dye after complexation of the hydrolysable cation(s);

f) determining a concentration of at least one of the acid form or the base form of the pH-sensitive dye in the solution A5 from the absorbance spectrum measured in step e);

g) determining a pH pH_A5 of the solution A5 from the concentration determined in step f); and h) determining the free acidity of the solution A1 from the concentration C3 determined in step c) and from the pH pH_A5 determined in step g), wherein pH_A2 and the volumes V1 and V2 are selected such that the solution A3 has a pH pH_A3 within the transition range of the pH-sensitive dye; and wherein the concentration C2 and the volumes V1 and V2 are selected such that the complexing agent is present in excess with respect to the hydrolysable cation(s) in the solution A3.

* * * * *